United States Patent [19]
Creedon et al.

[11] Patent Number: 5,987,507
[45] Date of Patent: Nov. 16, 1999

[54] MULTI-PORT COMMUNICATION NETWORK DEVICE INCLUDING COMMON BUFFER MEMORY WITH THRESHOLD CONTROL OF PORT PACKET COUNTERS

[75] Inventors: Tadhg Creedon, County Galway, Ireland; Paul J. Moran; Graeme J. McKerrel, both of Hemel Hempstead, United Kingdom

[73] Assignee: 3Com Technologies, Georgetown, Ky.

[21] Appl. No.: 09/222,359

[22] Filed: Dec. 29, 1998

[51] Int. Cl.⁶ .................................................... G06F 13/00
[52] U.S. Cl. ............................................................. 709/215
[58] Field of Search ...................... 364/DIG. 1 MS File, 364/DIG. 2 MS File; 710/123; 711/100, 149, 150, 154, 156, 163, 170; 709/200, 206, 207, 212, 213, 214, 215, 218, 220, 234, 235, 224

[56] References Cited

U.S. PATENT DOCUMENTS 4,458,314  7/1984  Grimes ..................................... 710/123

FOREIGN PATENT DOCUMENTS

0766425 A2  4/1997  European Pat. Off. .
WO 97/43869  11/1997  WIPO .

*Primary Examiner*—Robert B. Harrell
*Attorney, Agent, or Firm*—Nixon & Vanderhye P.C.

[57] ABSTRACT

A network device for use in a data communication network comprises: a multiplicity of ports capable of receiving input data; a common buffer memory for storing in respective buffers data received by the input ports; and processing system for controlling the writing of data into buffers and the reading of data from said buffers. The processing system determines whether the extent of occupation of the common buffer memory exceeds a threshold defined to represent congestion of the memory. Counter system enabled by the processing system on detection of the aforementioned threshold count units of input data through the respective ports, the processing system decrementing these counters as data is read out from the common buffer memory.

8 Claims, 2 Drawing Sheets

MULTI-PORT COMMUNICATION NETWORK DEVICE INCLUDING COMMON BUFFER MEMORY WITH THRESHOLD CONTROL OF PORT PACKET COUNTERS

FIELD OF THE INVENTION

The present invention relates to the management of data storage in a buffer which forms part of a network device, such as a switch or repeater, which has a multiplicity of ports for the reception of data, usually data in the form of addressed packets. The invention particularly relates to an improved system of management intended to be useful where one or more of the ports that receive data is constantly busy and might utilise too much of the available memory space in the device.

BACKGROUND TO THE INVENTION

Network devices which have a multiplicity of input ports for the reception of data such as packet data, from a variety of sources commonly provide buffering of the input ports. Thus data received at a port is stored in a buffer memory temporarily until such time as it can be transmitted onwards to its intended destination. By way of example only, the device may include some system for giving data of one type or another or data from a source or group of sources priority over other data. For this purpose the network device might have a contention-resolution system, such as a csma/cd contention-resolution system wherein data from only one port at a time may be transmitted onwardly.

Modern network devices of this general character commonly include a single large memory, or possibly a set of memories which are operated as a single logical entity. The memory may be constituted by random access memory which is under the control of an appropriate processing device which may have recourse to a table of pointers which define and provide access to individual buffers within the memory. Data from any given port may be directed to a buffer by means of a respective pointer, this buffer remaining occupied until, normally under control of the processing means and a respective read pointer, the data is onwardly transmitted either directly or by way of an output buffer and the buffer is 'returned', that is to say made available for the storage of fresh data received from one or other of the input ports.

In systems of this nature, there is a significant danger that ports that are constantly busy can demand data storage in all the available memory space so that other ports which are receiving data are deprived of buffers for the storage of data received at those ports. In such circumstances data packets may be dropped, to the obvious detriment of the performance of the network, particularly in respect of traffic through non-congested ports.

It is common practice to provide some protection for the congestion of buffer memory. One example is to provide for each receiving port a respective buffer of which the operation is independent of the main common buffer memory and which acts as another stage of buffering. For example, a first-in, first-out (FIFO) memory may be provided for each port. Such a solution requires additional hardware and control for each port. Another solution is to associate in the main common memory certain groups of buffers with each port, so that a portion of the buffer memory is reserved for the use of each respective port. Such a system is more complex to control than an ordinary buffer memory and is somewhat inflexible.

SUMMARY OF THE INVENTION

In a buffer management system according to the invention, each port is associated with a counter, which is preferably normally cleared. If the common buffer memory approaches a congested state, which may be monitored by a processing means allocating space in the memory, these counters may be enabled to count. As buffers are allocated for data which continues to arrive on the ports, the counters may be incremented, counting up or down according to the organisation of the counters, until certain watermarks represented by predetermined counts are reached. At the various watermarks, various actions can be taken, such as enabling flow control. The buffers may retain an identification of the receive port from which the data came and as data is transmitted, freeing the buffers, the respective counters may be decremented. Buffers which are returned, that is to say made available for the reception of fresh received data, may be returned to a common pool or be allocated to the ports in a round robin fashion or according to some system of priority. If the memory becomes decongested at any stage, all the counters may be cleared.

DETAILED DESCRIPTION

Figure 1:
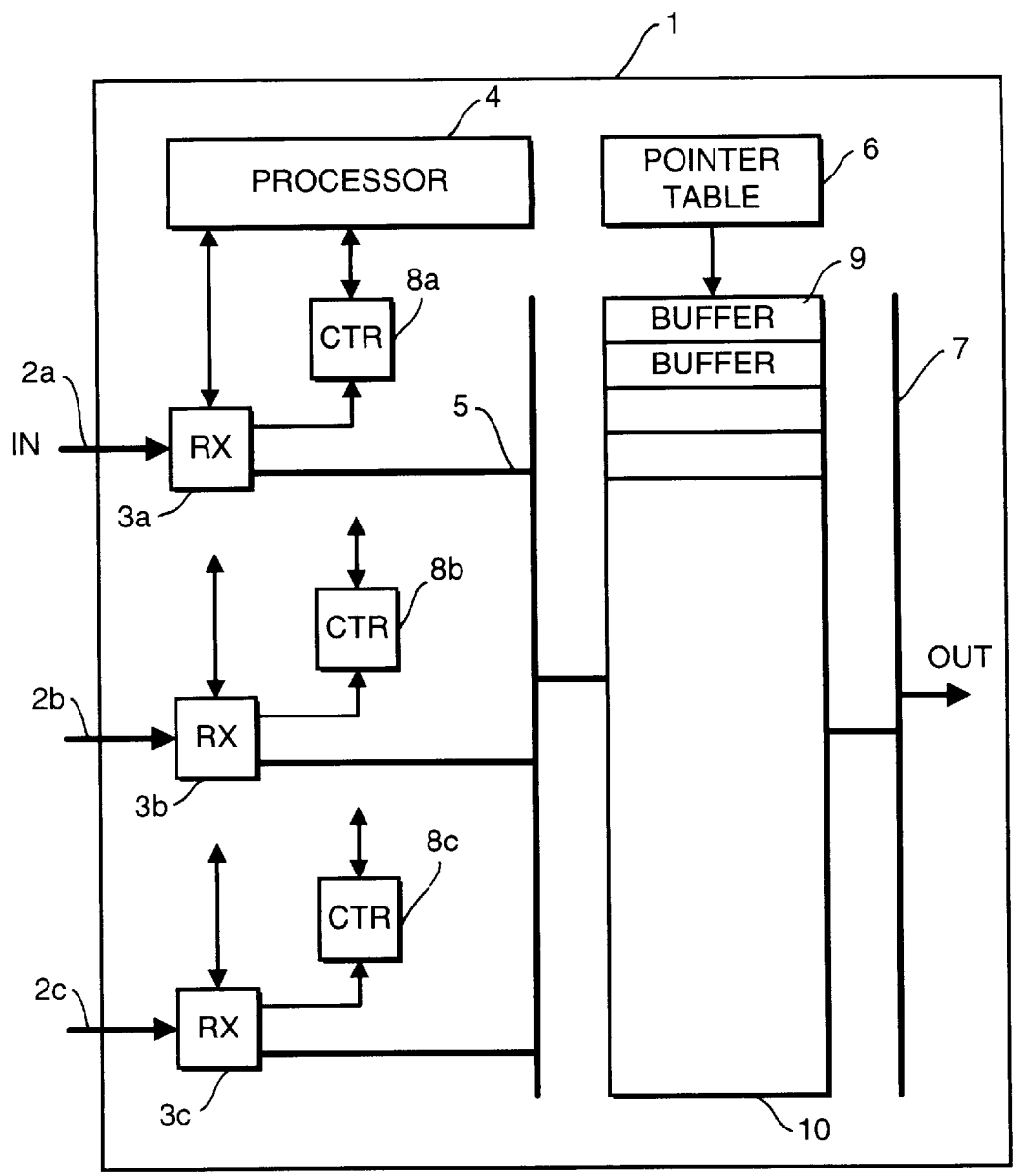
FIG. 1 illustrates in schematic fashion a network switch according to the invention.

A network switch 1 according to the invention includes a multiplicity of receive ports of which only three (2a, 2b and 2c) are shown. In general there would be a substantial number, such as twenty-four or more ports for the network device. Each of the ports is connected through a receiving stage 3a–3c respectively which is monitored and controlled by a processor 4. The ports are coupled by way of the receiving stages and a data bus 5 to a common buffer memory 6. In accordance with known practice, data packets or (more usually) groups of data packets are stored in buffers allocated to the data by means of 'write' pointers under control of the processor. The pointers may be stored in a pointer table 6 and themselves control buffers 9 in the memory 10.

Data is read out from the buffers under the control of 'read' pointers generated by the processor. Under what conditions the data is read out from the buffer memory is not of any great consequence to the invention and the common buffer memory for the input ports may only be a prelude to further stages within the same network device. For the purpose of the present invention it is only necessary that data stored in the buffer memory be read out from time to time under conditions which may vary according to the organisation or purpose of the device 1.

In the system as described, the buffer memory 10 is intended to provide a common pool of buffers for use by any of the ports. It follows that if one or more of the ports become unduly busy, it may devour too much of the available memory space so that other received ports are starved of buffers.

Associated with each of the ports is a respective counter (8a, 8b etc) which may be cleared by the processor 4 when the processor, which typically maintains a table of control pointers, detects when the buffer memory has reached some predetermined, selectable proportion of the total useable memory space. As buffers are allocated for data which continues to arrive on any given port, the respective counter is incremented. Each of the counters therefore indicates traffic in excess of a level which is set by an arbitrary definition of congestion or shortage of buffers within the buffer memory. The counters therefore provide an additional degree of control and, by setting various watermarks, i.e. particular counts which give rise to control signals if the count passes through those thresholds or watermarks, various actions, at the choice of the designer, may be enabled. The detection of the predetermined counts, which may be programmable, and the consequential actions will be predetermined by the processor 4.

For example, a particular threshold may determine flow control so that if the traffic count for a particular port when the buffer memory is by definition likely to be congested exceeds some high watermark, the reception of data packets on that port may be inhibited. Alternatively, a small amount of memory space may be allocated to any port in which the traffic count after the onset of congestion in the buffer memory exceeds a watermark which is lower than the aforementioned high watermark.

Since the data in the buffer memories retains an identification of the port number, there is an easy means of enabling the processing means to decrement the traffic counter associated with a port when a buffer holding data previously received by this port is returned. However, the counters may be decremented according to a round robin scheme or other algorithm.

Various developments of the scheme are possible. For example, buffers may be allocated preferentially to ports which have a high traffic count, either on a predetermined or adaptive basis.

Figure 2:
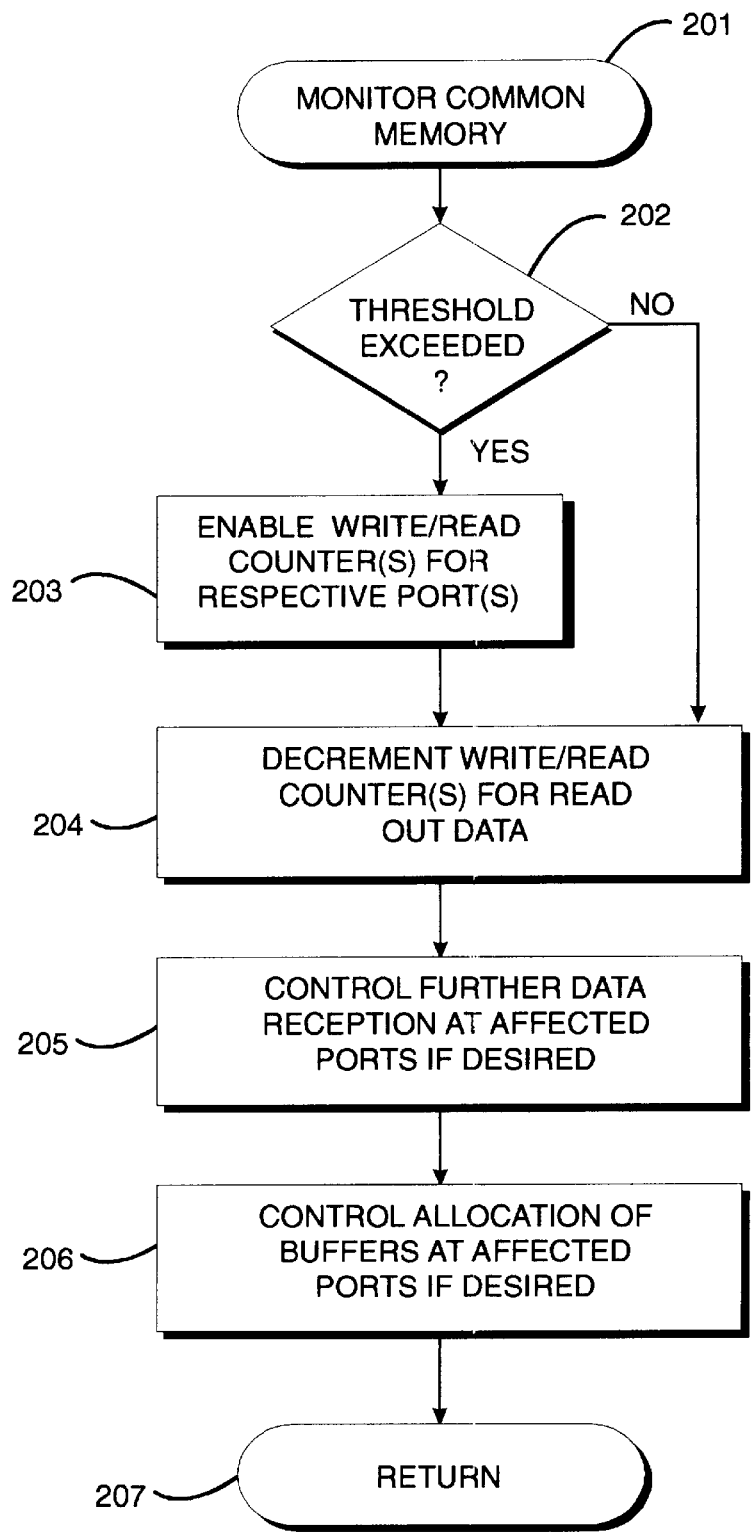
FIG. 2 schematically illustrates an exemplary method performed with the exemplary apparatus of FIG. 1.

A method of operating a network device such as that in FIG. 1 which has a multiplicity of input ports and a common buffer memory for the temporary storage of data received by the input ports, any of the data ports being able to supply input data to the memory is illustrated schematically in FIG. 2. Here a subroutine is depicted at 201 for monitoring the occupation of the common memory to determine the exceeding of a threshold which indicates congestion in the memory. If a threshold test is exceeded at 202, then, in response to such indication, a respective counter associated with each affected input port is enabled at 203 so as to obtain a numerical representation of input data traffic through the respective port subsequent to the onset of congestion. Thereafter, at 204, a counter is decremented when data has been read out from its associated buffer. At 205, such thresholds may be employed in the counting levels to determine the further reception of input data at the respective input port. Furthermore, at 206, such thresholds may be employed in the counting levels to control the allocation of available buffers for the storage of data received by the input ports. A return from the subroutine is indicated at 207.

What is claimed is:

1. A method of operating a network device which has a multiplicity of input ports and a common buffer space for the temporary storage of data received by the input ports, any of the data ports being able to supply input data to the common memory, the method comprising:

monitoring the occupation of the common memory space to determine the exceeding of at least one threshold which indicates congestion in the common memory space;

enabling, in response to said indication, a respective counter associated with each input port so as to obtain a numerical representation of input data traffic through the respective port subsequent to the onset of congestion; and decrementing each enabled counter when data has been read out from its respective buffer area.

2. A method as in claim 1 further comprising:
employing thresholds in the counting levels to determine further reception of input data at the respective input port.

3. A method as in claim 1 further comprising:
employing thresholds in the counting levels to control allocation of available buffer areas for the storage of data received by the input ports.

4. A network device for use in a data communication network, said device comprising:

a multiplicity of ports capable of receiving input data;

a common buffer memory space for storing in respective buffer areas thereof data received by the input ports;

processing means for controlling the writing of data into said buffer areas and the reading of data from said buffer areas;

said processing means determining whether the extent of occupation of the common buffer memory space exceeds at least one threshold defined to represent congestion of the common memory space; and counter means enabled by the processing means on detection of the aforementioned threshold to count units of input data through the respective ports, the processing means decrementing these counters as data is read out from the common buffer memory space.

5. A network device comprising:

a multiplicity of ports for the reception of data packets;

a single common buffer memory means for the temporary storage of data packets received by said ports, all said ports being coupled to supply input data packets to said single common buffer memory means;

means for monitoring the occupation of the common memory to determine the exceeding of at least one common threshold which defines congestion in said memory;

a respective counter associated with each of said ports;

means for enabling, in response to said indication, a respective counter associated with each port so as to obtain a numerical representation of input data traffic through the respective port subsequent to the onset of congestion; and means for decrementing at least one of said counters when data has been read out from a buffer.

6. The device as in claim 5, wherein each counter defines at least one respective threshold.

7. The device as in claim 6, wherein said at least one respective threshold defines a level associated with inhibition of the reception of data packets by a port.

8. A network device for use in a data communication network, said device comprising:

a multiplicity of ports, each capable of receiving input data packets;

a single common buffer memory means, coupled to all said ports, for receiving data packets therefrom and for storing in buffer areas therein data received by any of said ports;

processing means for controlling the writing of data packets into said buffer areas and the reading of data packets from said buffer areas, said processing means determining whether the extent of occupation of said single common buffer memory means exceeds at least one threshold defined to represent congestion of the memory; and counter means for each of said multiplicity of ports, said counter means being enabled by the processing means on detection of said threshold to count units of input data through each respective port, said processing means decrementing respective ones of said counter means as data is read out from the common buffer memory.

\* \* \* \* \*

UNITED STATES PATENT AND TRADEMARK OFFICE
CERTIFICATE OF CORRECTION

PATENT NO. : 5,987,507
DATED : November 16, 1999
INVENTOR(S) : Tadhg CREEDON et al It is certified that error appears in the above-identified patent and that said Letters Patent is hereby corrected as shown below:

After data item [22], insert : On the title page:

--[30] Foreign Application Priority Data May 28, 1998 [GB] Great Britain ...9811466.3--

At item [73] assignee's address should read --Georgetown, Grand Cayman (KY)--.

Signed and Sealed this

Twenty-third Day of May, 2000

Attest:

Attesting Officer

Q. TODD DICKINSON

Director of Patents and Trademarks